United States Patent
Wang et al.

(10) Patent No.: US 11,835,730 B2
(45) Date of Patent: Dec. 5, 2023

(54) LIDAR SCANNING MIRROR WITH A PATTERNED FREZNEL ZONE PLATE PROFILE

(71) Applicant: BEIJING VOYAGER TECHNOLOGY CO., LTD., Beijing (CN)

(72) Inventors: Youmin Wang, Berkeley, CA (US); Yue Lu, Mountain View, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 445 days.

(21) Appl. No.: 17/136,976

(22) Filed: Dec. 29, 2020

(65) Prior Publication Data
US 2022/0206307 A1  Jun. 30, 2022

(51) Int. Cl.
| | |
|---|---|
| G02B 27/30 | (2006.01) |
| G01S 7/481 | (2006.01) |
| G02B 26/08 | (2006.01) |
| G02B 26/10 | (2006.01) |
| G02B 5/18 | (2006.01) |

(52) U.S. Cl.
CPC ............ *G02B 27/30* (2013.01); *G01S 7/4817* (2013.01); *G02B 5/189* (2013.01); *G02B 26/0833* (2013.01); *G02B 26/10* (2013.01)

(58) Field of Classification Search
None
See application file for complete search history.

(56) References Cited

U.S. PATENT DOCUMENTS

| | | | |
|---|---|---|---|
| 2019/0196179 A1* | 6/2019 | Sarkar | G02B 27/1086 |
| 2020/0393545 A1* | 12/2020 | Shani | G01S 7/4811 |
| 2021/0263198 A1* | 8/2021 | Zhu | G01S 17/894 |

* cited by examiner

*Primary Examiner* — Jennifer D. Carruth
(74) *Attorney, Agent, or Firm* — BAYES PLLC (57) ABSTRACT

Embodiments of the disclosure provide a collimating scanner for an optical sensing system, a method for fabricating the collimating scanner, and a transmitter that includes the collimating scanner. An exemplary collimating scanner may include a scanning mirror configured to steer a light beam towards an object. The collimating scanner may also include a Fresnel zone plate profile patterned on the scanning mirror configured to collimate the light beam. The disclosed collimating scanner eliminates the use a separate collimating lens and thus improves the form factor of the optical sensing system.

20 Claims, 6 Drawing Sheets

LIDAR SCANNING MIRROR WITH A PATTERNED FREZNEL ZONE PLATE PROFILE

TECHNICAL FIELD

The present disclosure relates to a collimating scanner for an optical sensing system, and more particularly to, a collimating scanner that is configured to steer and collimate light using a Fresnel zone plate profile patterned on a scanning mirror of the collimating scanner.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

There is a continued demand for reducing the size of optical sensing systems. To fulfill this demand, form factor reductions have been introduced in recent designs of optical sensing system designs. Typically, these form factor reductions have been in the form of a reduced number and/or size of the elements included in the system. However, designers are reaching the upper limit to further form factor reductions by reducing the sizes of the individual elements. The required distances between certain elements may also prevent the form factor to further reduce. For example, the transmitter usually includes a collimating lens, which is typically located between the light source and the scanner and is used to collimate divergent light emitted by the light source. Once collimated, the beam is directed towards the scanner, which sends the collimated beam into free space during a sensing or scanning procedure. Due to the optical properties of light, the collimating lens must be placed at a minimum distance from the light source to accommodate for the focal length needed for the collimating lens to diverge/converge the light in a way that produces a collimated beam that can be used to accurately sense stationary or moving objects in the surrounding environment.

Typically, the light emitted by the light source has a divergence angle between, e.g., 20° to 60°, depending on the mode of operation and the axes of rotation. The aperture size of the collimating lens is typically greater than 30 mm and challenging to reduce without negatively impacting the accuracy of the sensing measurements. Moreover, the focal length of the collimating lens is similar to its aperture size, e.g., greater than or equal to 30 mm. Thus, the upper limit to form factor reductions may be bounded by, among others, the optical path within the transmitter required to accommodate the focal length of the collimating lens.

Hence, there is an unmet need for an optical sensing system that is configured to collimate light without the need for a separate collimating lens in the transmitter.

SUMMARY

Embodiments of the disclosure provide a collimating scanner for an optical sensing system. The collimating scanner may include a scanning mirror configured to steer a light beam towards an object. The collimating scanner may also include a Fresnel zone plate profile patterned on the scanning mirror configured to collimate the light beam.

Embodiments of the disclosure include a method of forming a scanning mirror with a Fresnel zone plate profile patterned thereon. The method may include forming a first wafer with a first set of actuator features. The method may further include bonding a second wafer to the first wafer. The method may further include forming a scanning mirror surface on the second wafer. The method may further include patterning a Fresnel zone plate profile on the scanning mirror surface. The method may also include etching the second wafer to form a second set of actuator features aligned with the first set of actuator features.

Embodiments of the disclosure may include a transmitter for an optical sensing system. The transmitter may include a light source configured to emit a light beam towards an object. The transmitter may further include a collimating scanner. The collimating scanner may include a scanning mirror configured to steer a light beam towards an object. The collimating scanner may also include a Fresnel zone plate profile patterned on the scanning mirror configured to collimate the light beam.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

Due to the challenges imposed by the constraints of the optical path of a collimating lens, as discussed in the BACKGROUND section above, the present disclosure provides a collimating scanner that eliminates the need for a collimating lens in the transmitter. More specifically, the collimating scanner of the present disclosure includes a Fresnel zone plate profile patterned on the scanning mirror. The Fresnel zone plate profile is designed such that the divergent light emitted by light source is focused into a collimated beam at the scanning mirror, which steers the collimated beam out into free space. Unlike a collimating lens, which uses refraction to collimate divergent light, the collimating scanner focuses divergent light using diffraction caused by the Fresnel zone plate profile. By eliminating the need for a collimating lens, the transmitter of the present disclosure may be designed with significant reductions to form factor as compared to conventional transmitters. At the same time, the transmitter of the present disclosure produces a collimated beam that may be used to sense objects in the surrounding environment with the high degree of accuracy needed for autonomous driving and high-definition map surveys.

Some exemplary embodiments are described below with reference to a scanner used in LiDAR system(s), but the application of the emitter array disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

Figure 1:
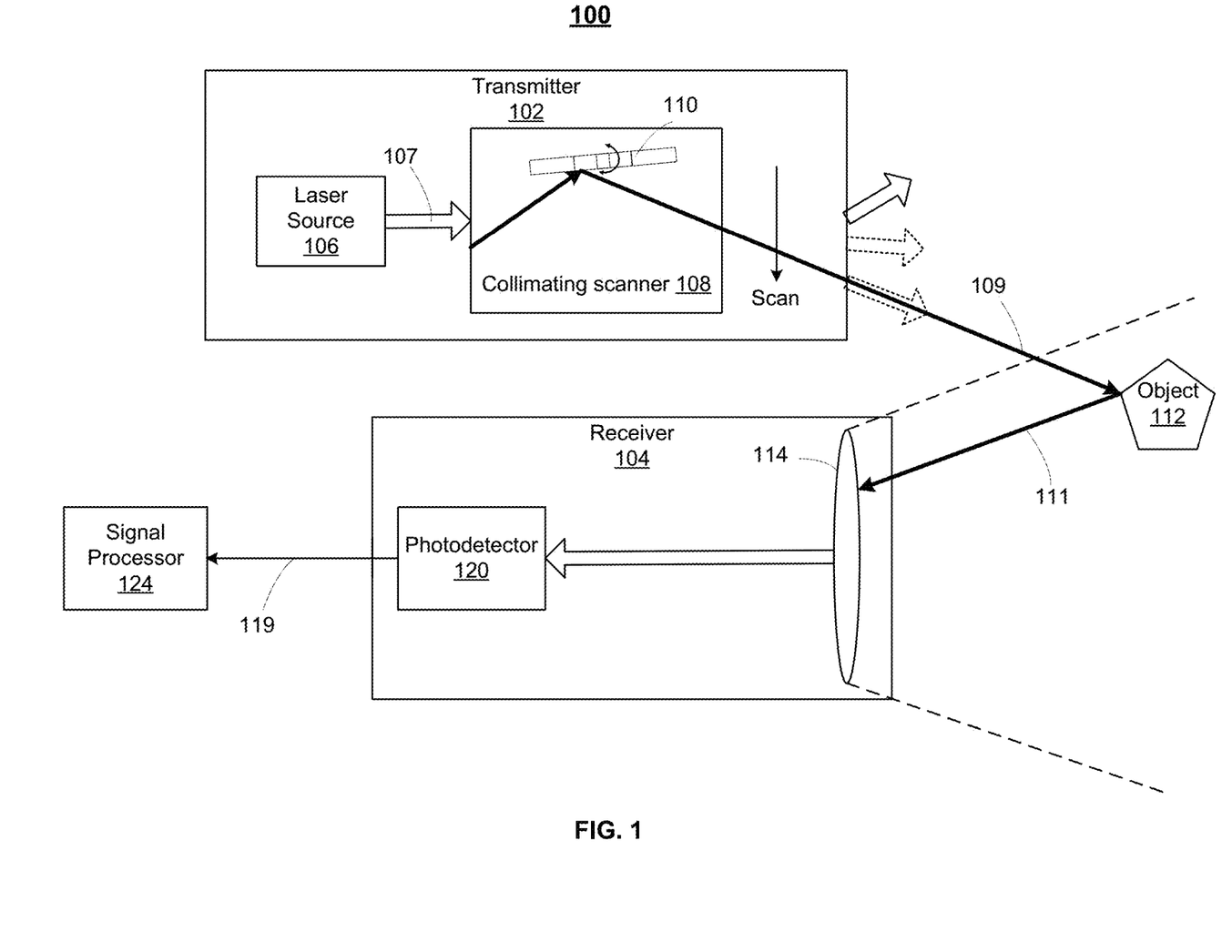
FIG. 1 illustrates a block diagram of an exemplary LiDAR system, according to embodiments of the disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser sources 106 and a collimating scanner 108. Collimating scanner 108 eliminates the need for a collimating lens in the transmitter 102. Thus, a collimating lens may be omitted from transmitter 102.

Transmitter 102 can sequentially emit a stream of pulsed laser beams in different directions within a scan range (e.g., a range in angular degrees), as illustrated in FIG. 1. Laser source 106 may be configured to provide a laser beam 107 (also referred to as "native laser beam") to collimating scanner 108. In some embodiments of the present disclosure, laser source 106 may generate a pulsed laser beam in the ultraviolet, visible, or near infrared wavelength range. Laser beam 107 may diverge in the space between the laser source 106 and the collimating scanner 108.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser source 106 for emitting laser beam 107.

Collimating scanner 108 may be configured to emit a collimated laser beam 109 to an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles. In some embodiments consistent with the present disclosure, collimating scanner 108 may include a micromachined mirror assembly having a scanning mirror with a Fresnel zone plate profile (described in connection with FIG. 2A) patterned onto a surface thereof, such as a MEMS mirror 110.

In some embodiments, at each time point during the scan, collimating scanner 108 may focus divergent light from the light source into a collimated laser beam 109 that is emitted to object 112 in a direction within a range of scanning angles by rotating the micromachined mirror assembly. MEMS mirror 110, at its rotated angle, may collimate and deflect the laser beam 107 generated by laser sources 106 to the desired direction, which becomes collimated laser beam 109. The micromachined mirror assembly may include various components, for example, among other things, a scanning mirror (e.g., MEMS mirror 110) with a Fresnel zone plate profile patterned thereon, a first set of anchors, one or more actuators each coupled to an anchor in the first set of anchors, a second set of anchors, at least one spring coupled to at least one anchor in the set of anchors, and a substrate, just to name a few. In certain implementations, the Fresnel zone plate profile may be patterned on the scanning mirror during a fabrication process of the scanning mirror and/or the micromachined mirror assembly. For example, an exemplary fabrication process (described in connection with FIGS. 3A-4) may include, among others, deep-reactive ion etching (DRIE) of Silicon-on-Insulator (SOI) wafer(s) that form a scanning mirror with a Fresnel zone plate profile patterned thereon and self-aligned vertical drive comb actuators. However, the Fresnel zone plate profile may be patterned onto the scanning mirror by any other known process or technique without departing from the scope of the present disclosure.

In some embodiments, receiver 104 may be configured to detect a returned laser beam 111 returned from object 112. The returned laser beam 111 may be in a different direction from laser beam 109. Receiver 104 can collect laser beams returned from object 112 and output electrical signals reflecting the intensity of the returned laser beams. Upon contact, laser light can be reflected by object 112 via backscattering, e.g., such as Raman scattering and fluorescence. As illustrated in FIG. 1, receiver 104 may include a lens 114 and a photodetector 120. Lens 114 may be configured to collect light from a respective direction in its FOV and converge the laser beam to focus before it is received on photodetector 120. At each time point during the scan, returned laser beam 111 may be collected by lens 114. Returned laser beam 111 may be returned from object 112 and have the same wavelength as laser beam 109.

Photodetector 120 may be configured to detect returned laser beam 111 returned from object 112. In some embodiments, photodetector 120 may convert the laser light (e.g., returned laser beam 111 collected by lens 114) into an electrical signal 119 (e.g., a current or a voltage signal). Electrical signal 119 may be generated when photons are absorbed in a photodiode included in photodetector 120. In some embodiments of the present disclosure, photodetector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by photodetector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices.

Figure 2A:
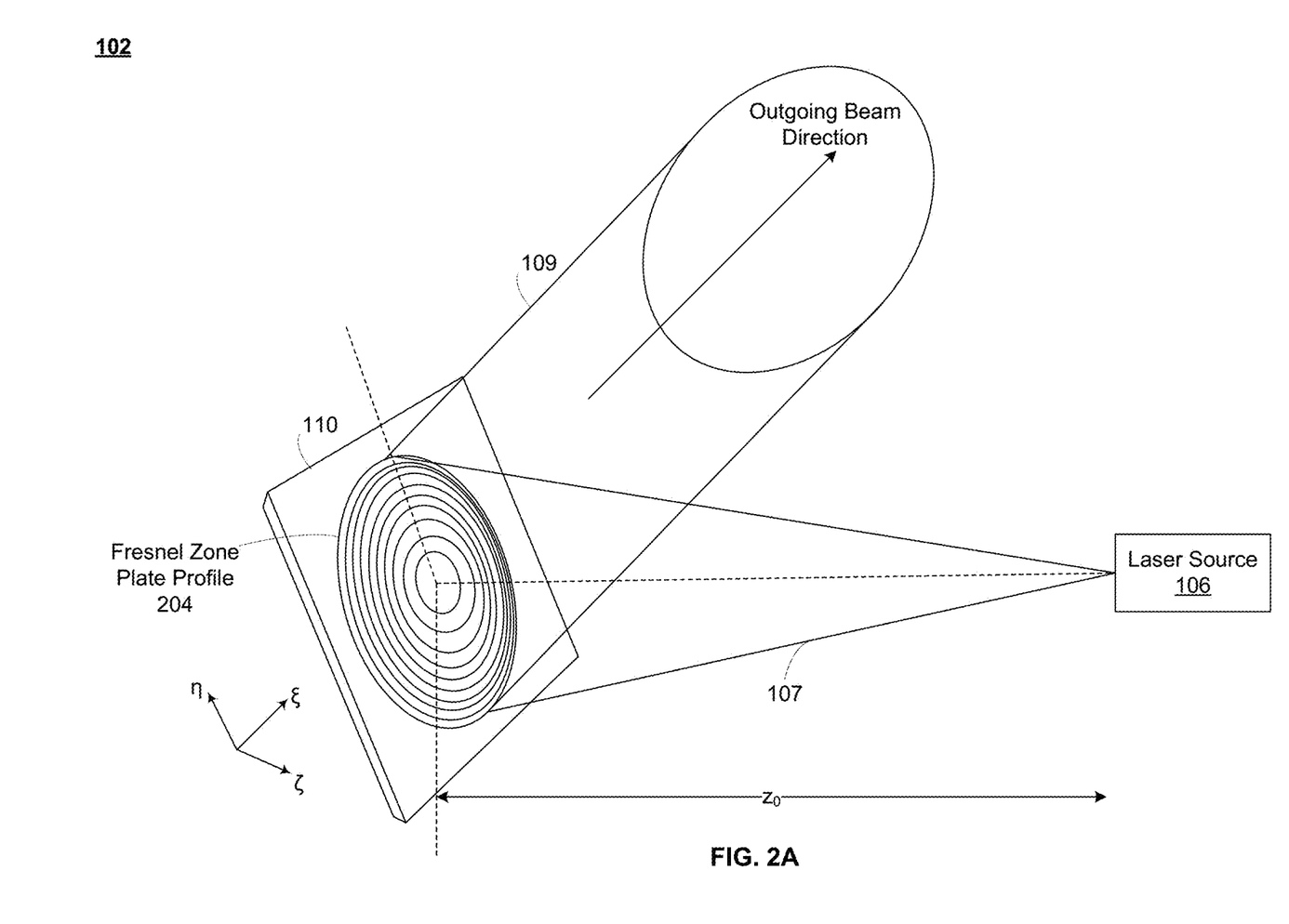
FIG. 2A illustrates a diagram of an exemplary collimating scanner, according to embodiments of the disclosure.
Figure 2B:
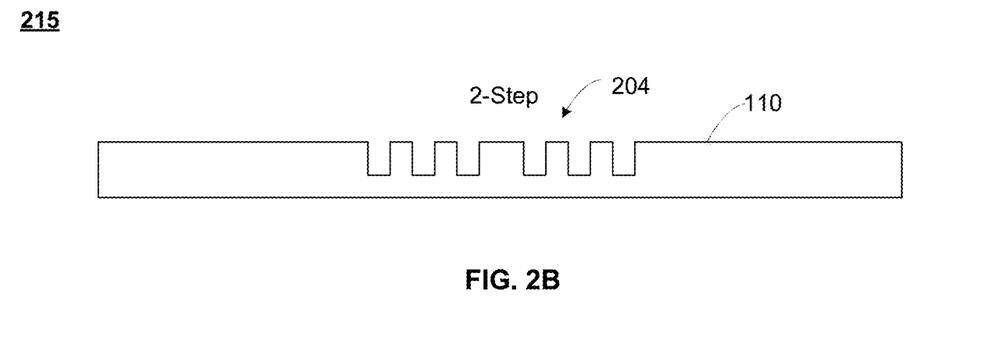
FIG. 2B illustrates a cross-sectional view of an exemplary scanning mirror with a two-step Fresnel zone plate profile, according to embodiments of the disclosure.
Figure 2C:
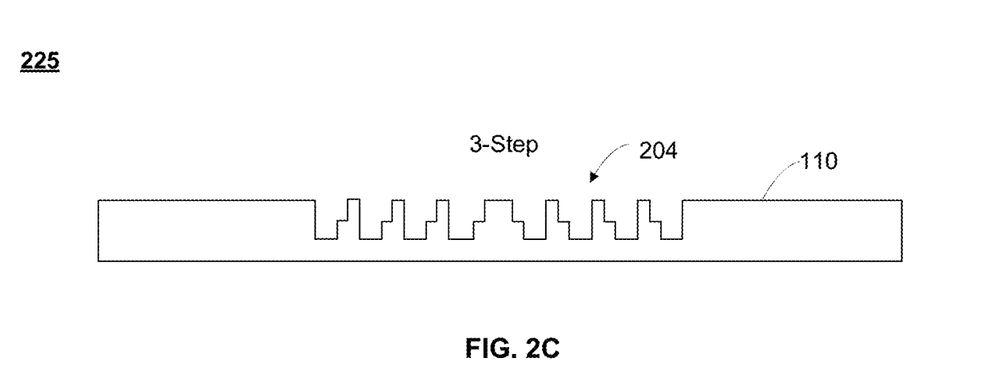
FIG. 2C illustrates a cross-sectional view of an exemplary scanning mirror with a three-step Fresnel zone plate profile, according to embodiments of the disclosure.
Figure 2D:
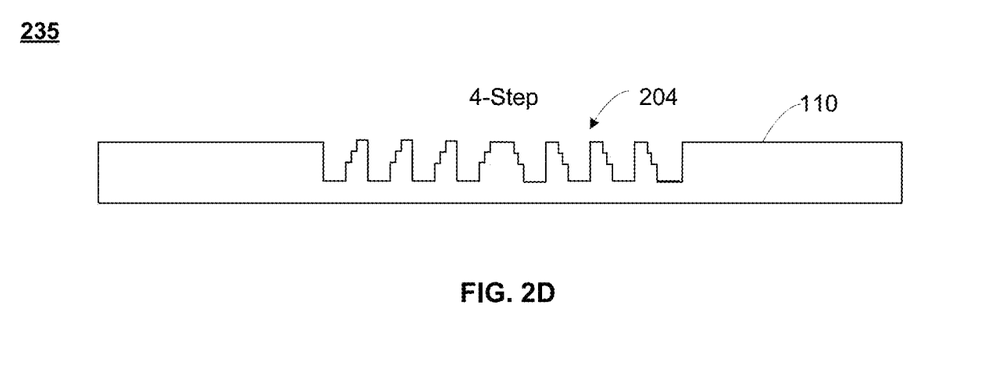
FIG. 2D illustrates a cross-sectional view of an exemplary scanning mirror with a four-step Fresnel zone plate profile, according to embodiments of the disclosure.

FIG. 2A illustrates a detailed perspective view of transmitter 102 shown in FIG. 1, according to embodiments of the disclosure. In particular, FIG. 2A illustrates additional details of MEMS mirror 110 with the Fresnel zone plate profile patterned thereon. FIG. 2B illustrates a cross-sectional view of an exemplary scanning mirror 215 with a one-step Fresnel zone plate profile, according to embodiments of the disclosure. FIG. 2C illustrates a cross-sectional view of an exemplary scanning mirror 225 with a two-step Fresnel zone plate profile, according to embodiments of the disclosure. FIG. 2D illustrates a cross-sectional view of an exemplary scanning mirror 235 with a three-step Fresnel zone plate profile, according to embodiments of the disclosure. FIGS. 2A-2D will be described together.

An exemplary Fresnel zone plate profile 204 is patterned on surface of MEMS mirror 110, as illustrated in FIG. 2A. The Fresnel zone plate profile 204 may include a set of features, such as elliptical or circular grooves, which are etched into the surface of MEMS mirror 110 during the fabrication process. The set of features can be designed so that laser beam 107, which diverges over the distance zo, is diffracted around the grooves such that constructive interference occurs at a wavelength-dependent focal distance, creating a coil rated laser beam 109. For example, the features are formed a set of concentric rings (also known as Fresnel zones), which alternate between being a ring etched into the surface of MEMS mirror 110 and a non-etched ring, which is the surface of MEMS mirror 110 located between two etched rings. Light hitting the zone plate will diffract around the non-etched zones. The Fresnel zones can be spaced so that the diffracted light constructively interferes at the desired focus.

Various optical parameters of the transmitter 102 may affect the design of the Fresnel zone plate profile 204. These optical parameters may include, e.g., one of more of the surface area of MEMS mirror 110, the distance zo between laser source 106 and MEMS mirror 110, the divergence angle of laser beam 107, the angle at which laser beam 107 is incident upon MEMS mirror 110 (hereinafter, "incident angle"), the wavelength of the laser beam 107, and the output diameter of the laser beam 107 at laser source 106, just to name a few. In other words, different Fresnel zone plate profiles may be designed for different implementations depending on the optical parameters of the transmitter 102. More specifically, the shape (e.g., elliptical, circular, etc.), step height, and the pitch (e.g., the distance between grooves) of the Fresnel zone plate profile 204 may be selected based at least in part on the above-mentioned optical properties. For example, the shape of the Fresnel zone plate profile 204 is selected based at least in part on the incident angle. More specifically, when the incident angle is 0°, the Fresnel zone plate profile 204 may be circular. Otherwise, when the incident angle is non-zero, i.e., greater than or less than 0°, the Fresnel zone plate profile 204 may be elliptical.

In some embodiments, an elliptical Fresnel zone plate profile 204 may be designed based on one or more of the optical properties of the transmitter 102. For example, for elliptical Fresnel zone plate profile 204 that has n grooves, x and y are the coordinates on any point on one of the Fresnel zones and can be determined using Equation (1), where n is the number of grooves (i.e., the number of concentric rings or Fresnel zones in the profile), a is the major radius of each groove determined using Equation (2), and b is the minor radius of each groove determined using Equation (3). In Equations (1)-(3) shown below, θ is the incident angle of the laser beam and λ is the wavelength of the incident laser beam. Each of the grooves can be etched to a depth that is a quarter of λ.

$$\left(\frac{x}{a_n \cos\theta}\right)^2 + \left(\frac{y - b_n}{a_n}\right)^2 = 1, \quad \text{Equation (1)}$$

where $$a_n = \frac{\sqrt{n\lambda\left(f\cos^2\theta + \frac{n\lambda}{4}\right)}}{\cos^2\theta}, \quad \text{Equation (2)}$$

and $$b_n = \frac{n\lambda \sin\theta}{2\cos^2\theta}. \quad \text{Equation (3)}$$

Referring to FIGS. 2B-2D, different step heights may be selected for Fresnel zone plate profile 204 depending on the performance requirements of the optical sensing system. In some embodiments, the Fresnel zone plate profile can be binary, i.e., there are only two different values (also known as "steps") on the device surface. In alternative embodiments, the profile can have more than one step, e.g., 3-step, 4-step or more. The more height steps in the profile, the higher the efficiency of the Fresnel zone plate profile 204. Namely, higher order height steps (i.e., more steps in the groove height) may increase the intensity of the laser beam 107 that is focused into collimated laser beam 109. Larger number of steps for the Fresnel zone plate profile also renders higher optical efficiency as it reduces the quantization error. However, the more height steps in the profile, the higher the cost of fabricating a MEMS mirror 110 as, e.g., the grooves may be etched in multiple stages. Thus, the height steps of a Fresnel zone plate profile 204 may be selected based at least in part on the tradeoff between efficiency and cost. Examples of various height steps are illustrated in FIGS. 2B-2D.

For example, referring to FIG. 2B, a Fresnel zone plate profile 204 fabricated with a binary height step (i.e., 2-step) may focus, for example, 40-50% of incident laser beam 107 into collimated laser beam 109. Referring to FIG. 2C, a Fresnel zone plate profile 204 fabricated with a three-step height may focus, for example, 60-70% of incident laser beam 107 into collimated laser beam 109. Referring to FIG. 2D, a Fresnel zone plate profile 204 fabricated with a four-step height may focus, for example, more than 90% of incident laser beam 107 into collimated laser beam 109.

Furthermore, the depth of the grooves in the Fresnel zone plate profile 204 may be selected based on the wavelength of laser beam 107. By way of example and not limitation, the depth of the grooves may be one-quarter of the wavelength of laser beam 107. The fabrication process of the collimating scanner 108 is described below in connection with FIGS. 3A, 3B, and 4.

In some embodiments, the scanning mirror (e.g., MEMS mirror 110) of collimating scanner 108 may be actuated by MEMS actuators. For example, MEMS mirror 110 may be actuated by staggered vertical comb drives. The Fresnel zone plate profile, the MEMS mirror, and the MEMS actuators may be fabricated together in the same fabrication process. In some embodiments, the MEMS Fresnel zone plate may be fabricated with the staggered vertical comb drives by a comb self-alignment process in bonded double-SOI wafers.

Figure 3A:
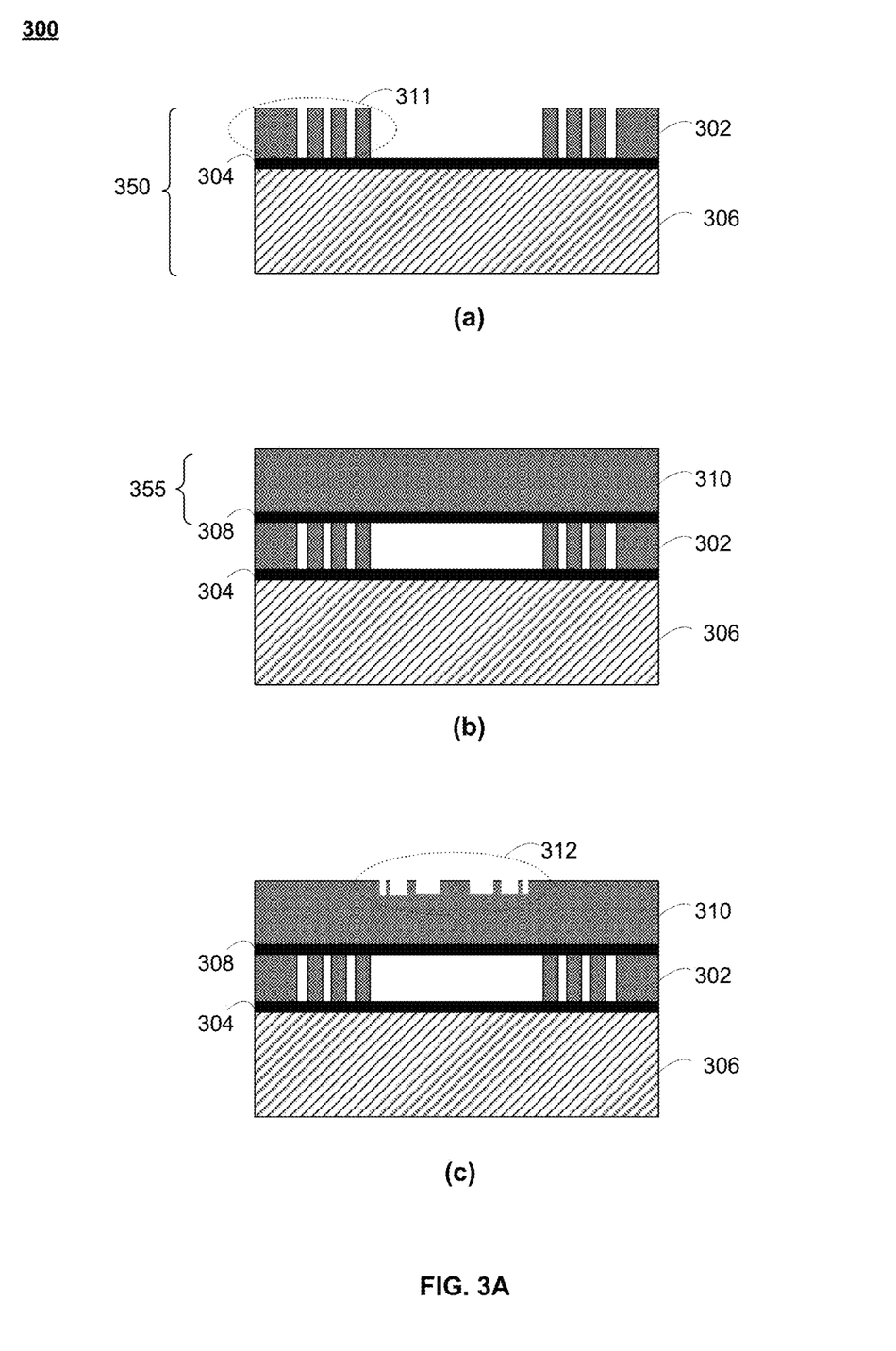
FIGS. 3A and 3B illustrate an exemplary process flow for fabricating a collimating scanner, according to embodiments of the disclosure.
Figure 3B:
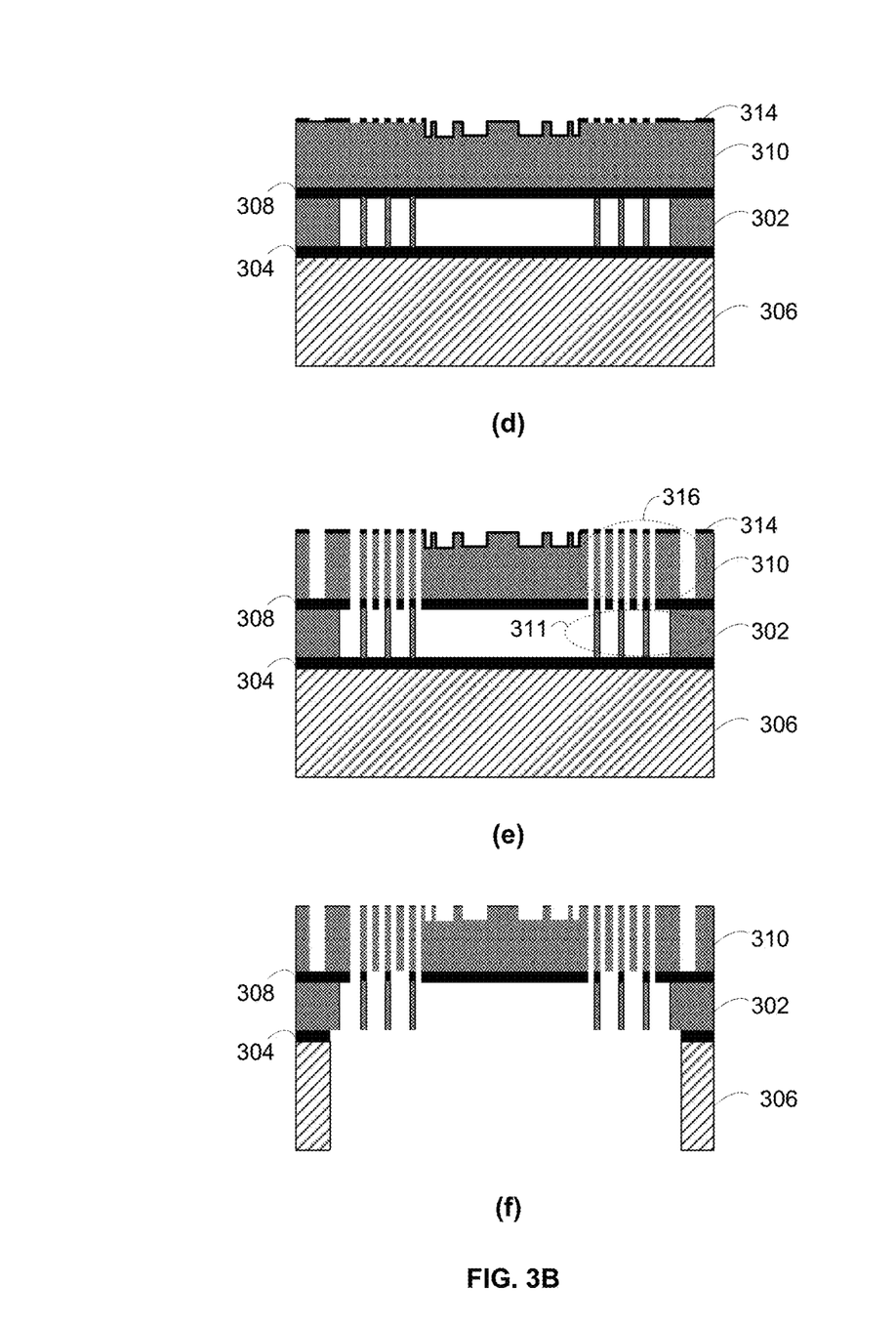
Figure 4:
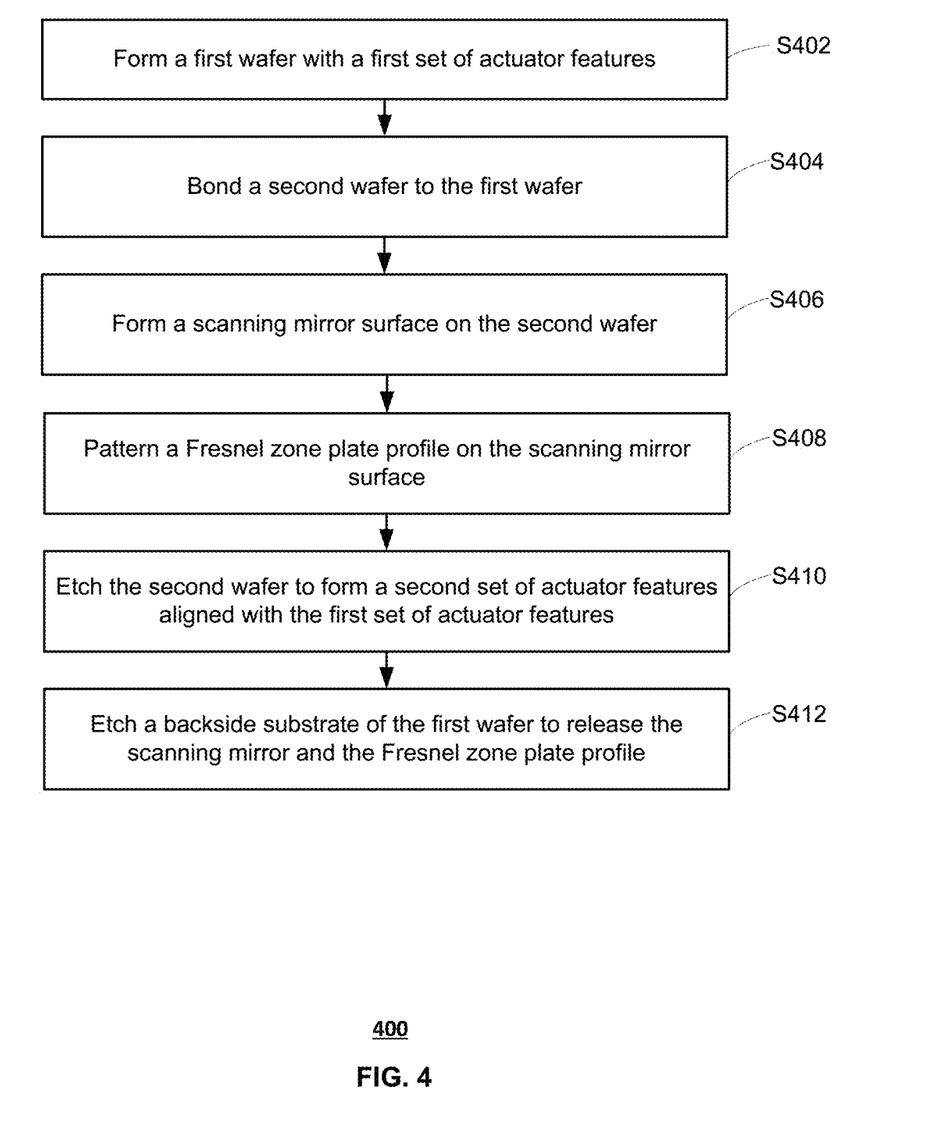
FIG. 4 illustrates a flow chart of an exemplary method for fabricating a collimating scanner, according to embodiments of the disclosure.

FIGS. 3A and 3B illustrate an exemplary process flow 300 for fabricating collimating scanner 108 from FIG. 1, according to embodiments of the disclosure. Process flow 300 may include steps (a)-(f), which may be used to fabricate, e.g., MEMS mirror 110 with a Fresnel zone plate profile 204 patterned thereon and one or more actuators (e.g., drive combs). Process flow 300 may be a drive comb self-alignment process that uses bonded double-SOI wafers to fabricate MEMS mirror 110, Fresnel zone plate profile 204, and staggered vertical comb drives. In certain implementations, one or more of steps (a)-(f) may be omitted when MEMS mirror 110 is fabricated for an optical sensing system that does not use staggered vertical drive combs, for example. Moreover, steps (a)-(f) in FIGS. 3A and 3B and steps S402-S412 may be performed by any type of fabrication system and/or device without departing from the scope of the present disclosure. FIG. 4 illustrates a flowchart of an exemplary method 400 for fabricating collimating scanner 108 from FIG. 1, according to embodiments of the disclosure. Method 400 may include steps S402-S412 as described below. It is to be appreciated that some of the steps may be optional, and some of the steps may be performed simultaneously, or in a different order than shown in FIG. 4. FIGS. 3A, 3B, and 4 will be described together.

Referring to FIG. 4, the fabrication process may begin at step S402. At S402, a first wafer 350 may be formed with a first set of actuator features 311. An example of the first wafer 350 is illustrated at step (a) in FIG. 3A. By way of example and not limitation, first wafer 350 may be a Silicon-on-Insulator (SOI) wafer, which may include first insulating layer 304 and first device layer 302. Furthermore, forming the first wafer 350 with the first set of actuator features 311 may include a plurality of suboperations, which are depicted at step (a) in FIG. 3A. For example, referring to step (a) in FIG. 3A, forming the first wafer 350 (e.g., at step S402 in FIG. 4) may include forming a substrate layer 306. Substrate layer 306 may be formed from silicon or any other material used in the fabrication process for a scanner or scanning mirror known in the art. Still referring to step (a) in FIG. 3A, forming the first wafer 350 may include forming a first insulating layer 304 on substrate layer 306. In certain implementations, first insulating layer 304 may be silicon dioxide or any other insulating material used in the fabrication process for a scanner or scanning mirror known in the art. Referring again to step (a) in FIG. 3A, forming the first wafer 350 may further include forming a first device layer 302 on the first insulating layer 304. First device layer 302 may be a silicon wafer, e.g., such as a silicon <100> wafer. However, first device layer 302 may be another type of wafer without departing from the scope of the present disclosure. As depicted at step (a) in FIG. 3A, the first set of actuator features 311 (e.g., coarse features) of the stationary actuators (also referred to as a "stator actuators") may be etched using a Deep-Reactive-Ion-Etching (DRIE) operation.

At step S404 in FIG. 4, a second wafer 355 may be bonded to the first wafer 350. The second wafer 355 may be an SOI wafer, which includes a second insulating layer 308 and a second device layer 310. An example of a second wafer 355 bonded to a first wafer 350 is illustrated at step (b) in FIG. 3A. By way of example and not limitation, the second wafer 355 may include second insulating layer 308 and second device layer 310. For example, as depicted at step (b) in FIG. 3B, the second insulating layer 308 and the second device layer 310 may be bonded to the first wafer 350. By way of example and not limitation, the second device layer 310 may include a silicon <100> wafer fusion bonded on top of the first wafer 350.

At step S406 in FIG. 4, a scanning mirror surface may be formed on the second wafer 355. For example, at step (c) in FIG. 3A, forming the scanning mirror surface may include grinding the second device layer 310 to achieve a small surface roughness.

At step S408 in FIG. 4, a Fresnel zone plate profile may be patterned on the scanning mirror surface. More specifically, patterning the Fresnel zone plate profile may include a plurality of suboperations. For example, at step (c) in FIG. 3A, the set of features 312 (e.g., circular or elliptical grooves depending on the implementation) of the Fresnel zone plate profile may be patterned (not illustrated) to quarter-wavelength depth on the scanning mirror surface. The pattern may be formed using, e.g., a layer of silicon dioxide that covers the regions of the scanning mirror surface that are not to be etched. Furthermore, at step (c) in FIG. 3A, the Fresnel zone plate profile may be etched after the pattern is formed on the scanning mirror surface At step S410 in FIG. 4, the second wafer 355 may be etched to form a second set of actuator features 316 (e.g., moveable actuator features) that are aligned with the first set of actuator features 311 formed at step (a) in FIG. 3A. The first set of actuator features 311 and the second set of actuator features 316 may form a MEMS actuator including a plurality of staggered vertical comb drives configured to drive MEMS mirror 110 to steer rotate to a plurality of scanning angles. In certain implementations, etching the second wafer 355 to form the self-aligned second set of actuator features 316 may include a plurality of suboperations. For example, as depicted at step (d) in FIG. 3B, the second set of actuator features 316 may be patterned onto the scanning mirror surface, e.g., using an insulating layer (e.g., silicon dioxide) prior to etching the second set of features 316. As depicted at step (e) in FIG. 3B, the second set of actuator features 316, which are aligned with the first set of actuator features 311, are etched into a deposited insulating layer 314. In some embodiments, the etching may include (i) a DRIE-oxide etching process followed by (ii) a reactive ion etching (RIE)-DRIE etching process to form the second set of actuator features 316, which are self-aligned with the first set of actuator features 311.

At step S412 in FIG. 4, the substrate layer 306 of the first wafer 350 may be etched to release the scanning mirror including the Fresnel zone plate profile. For example, referring to step (f) in FIG. 3B, backside substrate DRIE and oxide RIE performed on the first wafer 350 and the second wafer 355 releases the scanning mirror removes any remaining protective oxide. The fabrication process may conclude after step S412.

Another aspect of the disclosure is directed to a non-transitory computer-readable medium storing instructions which, when executed, cause one or more processors to perform the methods, as discussed above, e.g., the process of designing the Fresnel zone plate profile to be patterned on the scanning mirror. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon. It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A collimating scanner for an optical sensing system, comprising:
    a scanning mirror configured to steer a light beam towards an object; and
    a Fresnel zone plate profile patterned on the scanning mirror configured to collimate the light beam
    wherein the scanning mirror is driven by a MEMS actuator, wherein the MEMS actuator and the scanning mirror with the Fresnel zone plate are self-aligned.

2. The collimating scanner of claim 1, wherein a shape of the Fresnel zone plate profile is selected based at least in part on an incident angle of the light beam.

3. The collimating scanner of claim 2, wherein the shape of the Fresnel zone plate profile is elliptical when the incident angle is non-zero.

4. The collimating scanner of claim 2, wherein the shape of the Fresnel zone plate profile is circular when the incident angle is zero.

5. The collimating scanner of claim 1, wherein one or more of a pitch, a step height, or a shape of the Fresnel zone plate profile is predetermined according to one or more of a divergence angle, an operation wavelength, or a diameter of the light beam.

6. The collimating scanner of claim 1, wherein the Fresnel zone plate profile includes concentric rings of at least two height steps.

7. The collimating scanner of claim 1, further comprising the MEMS actuator configured to drive the collimating scanner to steer the light beam towards the object at a plurality of scanning angles, wherein the MEMS actuator and the scanning mirror with the Fresnel zone plate profile are formed using a self-alignment process.

8. The collimating scanner of claim 7, wherein the MEMS actuator includes a plurality of staggered vertical comb drives formed in a first wafer and the scanning mirror with the Fresnel zone plate profile is formed in a second wafer bonded to the first wafer.

9. The collimating scanner of claim 8, wherein the first wafer and the second wafer are Silicon on Insulator (SOI) wafers.

10. A method of forming a scanning mirror with a Fresnel zone plate profile patterned thereon, the method comprising:
    forming a first wafer with a first set of actuator features;
    bonding a second wafer to the first wafer;
    forming a scanning mirror surface on the second wafer;
    patterning a Fresnel zone plate profile on the scanning mirror surface; and
    etching the second wafer to form a second set of actuator features aligned with the first set of actuator features.

11. The method of claim 10, further comprising:
    etching a backside substrate of the first wafer to release the scanning mirror including the Fresnel zone plate profile.

12. The method of claim 10, wherein forming the first wafer comprises:
    forming a substrate layer;
    forming an insulating layer on the substrate layer; and
    forming a device layer on the insulating layer.

13. The method of claim 10, wherein the first wafer and the second wafer are Silicon on Insulator (SOI) wafers.

14. The method of claim 10, wherein the forming the scanning mirror surface on the second wafer comprises:
    grinding a surface roughness onto the second wafer.

15. The method of claim 10, wherein the patterning the Fresnel zone plate profile on the scanning mirror surface comprises:
    patterning the Fresnel zone plate profile to a quarter-wavelength depth on the scanning mirror surface; and
    etching the Fresnel zone plate profile after patterning.

16. The method of claim 10, wherein the etching the scanning mirror surface with the Fresnel zone plate profile patterned thereon to form the second set of actuator features comprises:
    performing a first etching process and a second etching process to form the second set of actuator features aligned with the first set of actuator features.

17. The method of claim 10, wherein the first set of actuator features are stator actuator features and the second set of actuator features are moveable actuator features.

18. The method of claim 10, wherein the first set of actuator features and the second set of actuator features form a MEMS actuator including a plurality of staggered vertical comb drives configured to drive the scanning mirror to steer rotate to a plurality of scanning angles.

19. The method of claim 10, wherein at least one of a pitch, step height, or shape of the Fresnel zone plate profile is designed based at least in part on information associated with a laser source.

20. A transmitter for an optical sensing system, comprising:
    a light source configured to emit a light beam towards an object; and
    a collimating scanner that comprises:
        a scanning mirror configured to steer the light beam towards the object; and
        a Fresnel zone plate profile patterned on the scanning mirror configured to collimate the light beam
        wherein the scanning mirror is driven by a MEMS actuator, wherein the MEMS actuator and the scanning mirror with the Fresnel zone plate are self-aligned.

* * * * *